United States Patent
Van Dijk et al.

(10) Patent No.: US 10,844,172 B2
(45) Date of Patent: Nov. 24, 2020

(54) PROCESS FOR PREPARING A POLYMER COMPOSITION, AND POLYMER COMPOSITION OBTAINABLE BY SAID PROCESS

(71) Applicant: DSM IP ASSETS B.V., Heerlen (NL)

(72) Inventors: Hans Klaas Van Dijk, Echt (NL); Michiel Gerardus Henricus Maria Baltussen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/744,263

(22) PCT Filed: Jul. 22, 2016

(86) PCT No.: PCT/EP2016/067545
§ 371 (c)(1),
(2) Date: Jan. 12, 2018

(87) PCT Pub. No.: WO2017/017017
PCT Pub. Date: Feb. 2, 2017

(65) Prior Publication Data
US 2018/0201731 A1 Jul. 19, 2018

(30) Foreign Application Priority Data
Jul. 29, 2015 (EP) .................................... 15178935

(51) Int. Cl.
*C08G 69/30* (2006.01)
*C08G 69/46* (2006.01)
(52) U.S. Cl.
CPC ............. *C08G 69/30* (2013.01); *C08G 69/46* (2013.01)

(58) Field of Classification Search
CPC ...................................................... C08G 69/30
See application file for complete search history.

(56) References Cited

U.S. PATENT DOCUMENTS

| 5,908,889 A | 6/1999 | Bailey et al. |
| 2015/0376377 A1* | 12/2015 | Mii .......................... C08K 3/22 524/607 |

FOREIGN PATENT DOCUMENTS

| WO | WO 00/09571 | 2/2000 |
| WO | 2014/118276 | 8/2014 |
| WO | 2014/118278 | 8/2014 |
| WO | WO 2014/118276 A1 * | 8/2014 |
| WO | WO 2014/118278 | 8/2014 |

OTHER PUBLICATIONS

International Search Report for PCT/EP2016/067545, dated Sep. 26, 2016, 3 pages.
Written Opinion of the ISA for PCT/EP2016/067545, dated Sep. 26, 2016, 4 pages.

* cited by examiner

*Primary Examiner* — Ana L. Woodward
(74) *Attorney, Agent, or Firm* — Nixon & Vanderhye P.C.

(57) ABSTRACT

The invention relates to a process for preparing a polymer composition, comprising a blending step wherein a first polymer (component A1) and at least one further component are dosed into and mixed in a mixing apparatus, and wherein the first polymer A1 is a granulate polyamide material directly obtained by direct solid state polymerization of a diammonium dicarboxylate salt prepared by fluidized bed spray granulation. The invention also relates to a dry-blend obtainable by said process.

10 Claims, No Drawings

PROCESS FOR PREPARING A POLYMER COMPOSITION, AND POLYMER COMPOSITION OBTAINABLE BY SAID PROCESS

This application is the U.S. national phase of International Application No. PCT/EP2016/067545 filed Jul. 22, 2016, which designated the U.S. and claims priority to EP Patent Application No. 15178935.1 filed Jul. 29, 2015, the entire contents of each of which are hereby incorporated by reference.

The present invention relates to a polymer composition and a polymer compounding process for preparing a polymer composition, i.e. a composition comprising a polymer and one or more further components. More particular, the invention relates to a dry-blend process, respectively a melt-mixing process wherein a polyamide is mixed with one or more further components. The invention also relates to a polymer composition obtainable by said process, more particular a polymer composition comprising a polyamide and one or more further components. The invention more particular relates to a polymer composition in the form of a dry-blend comprising a polymer and one or more other components.

With polymer compounding is herein understood the preparation of polymer compositions comprising a polymer and at least one other component. Different processes for preparing polymer compositions exist, which processes include the preparation of dry-blends, the preparation of molding compositions in the form of granulate material comprising a polymeric matrix with additives or other components dispersed in the polymeric matrix, and preparation of compositions in the final form of a molded part.

For polymer compounding different technologies can be applied. Herein the polymer composition can be prepared, apart from dry-blending of solid materials, by melt-mixing. Herein the polymer is melted and mixed with one or more further components. In such processes the polymer can be provided, prior to the mixing, in the form of a powder or in the form of pre-shaped granules. Pre-shaped granules can be prepared, for example, by pressing pellets of powder, or by melt extrusion of polymer, wherein the polymer is either provided as a powder and melted or is prepared in the melt and directly extruded.

Processing of polymer powder can complicate the dosing of the polymer since it encompasses the risk of blocking the dosing equipment, such as a hopper, and poses the problem of dusting, for example via a degassing vent. The intake capacity of powders is often also lower than the intake capacity of pellets, thus lowering overall throughput. Preparing pellets requires additional processing steps, and nevertheless involves the handling of powder anyway. Preparing polyamide polymers in the melt is not always possible, and often first a pre-polymer is prepared, either in the form of a powder, or in the form of a melt, which pre-polymer powder and pre-polymer melt are subsequently converted into pellets or granules and then polymerized further in the solid state to obtain the polyamide polymer in the form of pellets or granules.

For polymer compounding involving thermoplastic polymers, melt-mixing extrusion is the most widely used technology for over half a century. Semi-continuous melt extrusion has been proven to be a consistent and repeatable way to make high-quality products. For this technology both co-rotating intermeshing twin screw extruders as well as counter-rotating non-intermeshing twin screw extruders are used. Twin screw extruders are continuous small mass mixers that are the plastics industry's preferred manufacturing methodology for compounding and devolatilization. These extruders are often combined with auxiliary equipment, such as side-feeders for addition of solids, for example filler and fiber, liquid feeders, openings for venting and moisture removal, vacuum pumps, screen changers and pelletizers, for example strand pelletizing or underwater pelletizing.

Co-rotating intermeshing twin screw extruders are generally selected for high shear capabilities for superior melting of multiple polymer streams, intensive dispersive mixing for excellent homogeneity and flexibility of screw and barrel configuration design for various feed streams. Counter-rotating non-intermeshing twin screw extruders are typically characterized by low shear and high surface renewal for superior washing & venting; wide feed openings and downward screw motion for excellent feed acceptance; long L/D ratios permit multistage additions and reduced wear due to minimize rubbing surfaces in the non-intermeshing design.

Extruders employed for compounding typically comprise a barrel comprising the twin screws, wherein the following sections can be distinguished: a primary feeding section, optionally comprising a venting section and/or vacuum sections, a heating section, optionally one or more secondary feeding sections, and a discharging section, optionally comprising a screen and/or a die, or integrating finished product forming with in-line polymer compounding.

Generally the polymer is dosed at the primary feeding section, preferentially at the feed throat, for example via a so-called hopper, and has to be transported to and densified before entering the heating section. The polymer material typically enters through the feed throat (an opening near the rear of the barrel) and comes into contact with the screw. The rotating screw (normally turning at up to 600 rpm) forces the plastic beads forward into the heated barrel. In most processes, a heating profile is set for the barrel in which three or more independent PID-controlled heater zones gradually increase the temperature of the barrel from the rear (where the polymer enters) to the front. This allows the polymer material to melt gradually as they are pushed through the barrel and lowers the risk of overheating which may cause degradation in the polymer.

The extruder typically comprise one or more melt-mixing sections, for example behind the optional secondary feeding sections, or, when one or more other components are also fed in the primary feeding section, optionally together with the polymer, such a melt-mixing section may be combined with the heating section.

For high speed production and maximum capacity use it is important that the polymer can be dosed at sufficiently high speed and that the feeding section wherein the material is densified, is short, thereby allowing a larger space for the other sections and enabling a higher throughput while retaining good mixing quality. Good results are obtained with granulated polymer material obtained by a melt polymerization process or a process comprising a melt processing step, comprising a step wherein a polymer melt is extruded, cooled and granulated. Such granulated materials typically consists of granules with L/D ratios in the range of 1-4, more particular 2-3, and dimensions in the range of 1-3 mm for the diameter (D) and 1.5-4 mm for the length (L).

However, not all polymers can be produced by a melt polymerization process. For example semi-crystalline polyamides with high a melting point are preferably made via other routes, because of occurrence of degradation during melt-polymerization above the melting point of the polymer. One example of such a process comprises preparation of pre-polymer in aqueous solution under pressure, isolation of the pre-polymer from the solution by flashing of the solution into a flash vessel under evaporation of the aqueous solvent, and subjection the resulting polymer powder to solid state post condensation.

Another example includes the preparation of a nylon salt from aqueous solution, for example by crystallization precipitation or spray drying, followed by so-called direct solid state polymerization, i.e. direct polymerization of the salt in the solid state. This process, like the previous one, results in a polymer powder. The polymer powder so obtained typically has bad flow properties. Such polymer powders can give problems in the dosing via a hopper and in the transportation in the feeding section, and require longer dosing sections and/or vacuum assisted dosing, if possible at all. Furthermore, vacuum assisted dosing can only be applied on side feeders, not on the feed throat, thereby reducing the functional length of the extruder, and vacuum assisted dosing equipment blocks easily.

The aim of the present invention is to provide a process for preparing a polymer composition, wherein above problems are eliminated or at least reduced. This aim has been achieved with the process according to claim 1 of the present invention.

The granulate polyamide material (component A1) used in the process has good flow properties by itself. The effect of the process, wherein the polymer comprises a granulate polyamide material obtained by direct solid state polymerization of a diammonium dicarboxylate salt prepared by fluidized bed spray granulation, is that the risk of blocking of dosing equipment is low and the problem of dusting is limited, without the need of a shaping step of powder into granules before or after the polymerization step of the polyamide polymer. A further advantage is that transportation and densification can be done in an efficient manner and allow for high capacity utilization, even with relative short dosing sections and absence of vacuum assisted dosing.

A particular embodiment of the present invention concerns a dry-blending process.

Another particular embodiment of the present invention concerns a melt-blending process.

A further particular embodiment of the present invention concerns a dry-blend, obtainable by the dry-blending process, mentioned above.

A further embodiment of the present invention concerns a process, comprising steps of:
(i) Preparing a first polymer A1 by direct solid state polymerization of a diammonium dicarboxylate salt prepared by fluidized bed spray granulation, thereby obtaining the first polymer A1 as a granulate polyamide material, and
(ii) Preparing a polymer composition, comprising a blending step wherein the granulate polyamide material of the first polymer (component A1), obtained from step (i) and at least one further component are dosed into and mixed in a mixing apparatus.

Another further embodiment of the present invention concerns a process, comprising steps of:
(a) Preparing a diammonium dicarboxylate salt solution by dissolving a diamine and a dicarboxylic acid in water or in an aqueous solvent;
(b) Preparing a diammonium dicarboxylate salt granulate material by fluidized bed spray granulation of the diammonium dicarboxylate salt solution obtained in step a;
(c) Preparing a first polymer A1 by direct solid state polymerization of the diammonium dicarboxylate salt granulate material obtained from step (b), thereby obtaining the first polymer A1 as a granulate polyamide material, and
(d) Preparing a polymer composition, comprising a blending step wherein the granulate polyamide material of the first polymer (component A1), directly obtained from step (c) and at least one further component are dosed into and mixed in a mixing apparatus.

In the blending step in the process according to the invention, and the further embodiments thereof, at least two components are mixed, a first polymer (herein also referred to as component A1) and at least one further component. In order words, one or more further components are employed next to component A1. Herein the at least one further component suitably comprises a second polymer component (A2), and/or a secondary component (B).

It is noted that if a term is used herein in singular form, it is intended to include the plural form, unless specifically noted otherwise. The second polymer component (A2) can consist of one or more other polymers, i.e. polymers other than component (A1). The secondary component (B) can consist of one or more other components (B), i.e. other than polymer components A1 and/or A2.

It is noted that the expression "at least one" has the same meaning as "one or more". The expression "and/or", as used in expressions as, for example, "P and/or Q" has the same meaning as "either P, or either Q, or a combination of P and Q".

In the process according to the invention, the first polymer A1 is a granulate polyamide material directly obtained by direct solid state polymerization of a diammonium dicarboxylate salt prepared by fluidized bed spray granulation.

With the term "diammonium dicarboxylate salt" is herein understood a salt prepared from a diamine or a mixture of diamines, and a dicarboxylic acid or a mixture of dicarboxylic acids. Such a salt is also indicated as a diamine/dicarboxylic acid salt and known as nylon salt. Polyamides prepared from such salts are generally indicated as AA-BB polyamides. Herein an AA-BB polyamide is understood to be a polyamide comprising alternating AA and BB repeating units, wherein AA represents the repeating units derived from diamine and BB represents the repeating units derived from dicarboxylic acid. Throughout this text the wordings "diammonium dicarboxylate salt" and "nylon salt" are meant to have the same meaning and are therefore interchangeable.

With the term direct solid state polymerization process, is herein understood a polymerization process for preparing polyamide polymer from a nylon salt, wherein throughout said process the salt and resulting polyamide and any intermediate pre-polymer product thereof remain in the solid state. This in contrast to processes involving solid state post condensation (SSPC) of pre-polymers obtained from processes involving melt polymerization or solution polymerization, wherein a pre-polymer is prepared in a melt or in a solution.

For the wording "direct solid state polymerization", also the abbreviation "DSSP" will be used herein. In a DSSP process, a salt powder or granulate is heated to a reaction temperature below the melting temperature of the salt and its intermediates, thereby inducing polymerization of the salt and formation of the polyamide in the solid phase. While keeping the polymerization temperature below the melting point of the salt and the resulting polymer, the polymer is generally obtained as a granulate material. Solid-state polymerization processes, for polyamides, both Post-SSP and the Direct-SSP are also described in the book on "Solid-state Polymerization" by. C. D. Papaspyrides and S. N. Vouyiouka, Wiley, 2009.

The terms "melting point" and "melting temperature" are herein understood to have the same meaning, and therefore interchangeable. With the melting point, or melting temperature of the salt is herein understood the temperature, measured by the DSC method according to ISO-11357-1/3, 2011, on pre-dried samples in an N2 atmosphere with heating and cooling rate of 10° C./min. Herein Tm has been calculated from the peak value of the highest melting peak in the first heating cycle. Herein the granulate salt material is dried during 24 hours at 105° C. and under a vacuum of 100 mmHg.

In particular, the nylon salt can polymerized by direct solid state polymerization, by applying a suitable heating profile, in which the temperature remains below the melting temperature of the salt. Preferably, during the direct solid state polymerization, the granular salt material is heated to elevated temperature, and wherein said temperature is kept below the melting temperature of the salt minus 10° C., preferably below the melting temperature of the salt minus 15° C.

With the term "fluidized bed spray granulation" is herein understood a process wherein an aqueous solution or aqueous slurry of a nylon salt is sprayed onto or in a fluidized bed of nylon salt particles, and wherein a preheated gaseous medium is led through the fluidized bed, while evaporating the aqueous medium, thereby forming the granulate salt material.

Herein the aqueous solution comprises a diamine, or a mixture of diamines, and a dicarboxylic acid, or a mixture of dicarboxylic acids dissolved in an aqueous medium. The aqueous slurry further comprises a diammonium dicarboxylate salt dispersed in the aqueous medium and is suitably obtained from an aqueous solution comprising a diamine and a dicarboxylic acid dissolved in an aqueous medium, for example by partially evaporating the aqueous medium and concentrating the solution.

With the term "directly" in the expression "granulate polyamide material directly obtained by direct solid state polymerization of a diammonium dicarboxylate salt prepared by fluidized bed spray granulation", is herein meant that neither the salt as obtained from the fluidized bed spray granulation, nor the granulate polyamide material as obtained from the direct solid state polymerization, has been subjected to a pelletizing step or any other shaping step, nor has been dissolved or dispersed in a liquid medium, before or during the direct solid state polymerization or after the polymerization step.

Granulate salt material formed in a fluidized bed spray granulation process has been observed to typically consists of agglomerated particles. These particles tend to have a blackberry like structure, in particular in the earlier stage of the agglomeration process when the size of the particles is still relatively small, or have a more rounded off shape, when growing larger, likewise with more of a spherical like structure. This in contrast with salts in particulate form obtained from other processes. For example, salts from spray drying typically have a kind of puffed open popcorn type of structure or little droplets that are burst open. Salt in particulate form obtained by a dry solid process comprising dosing diamine to solid dicarboxylic acid shows a potato shape with a cracked surface like dried mud with many sub-micron crystallites. Salts precipitated from aqueous solution generally show a (partially) crystalline, needle shape, or very fine powder, or when obtained by evaporation may show big lumps.

The preparation of granulate salt material by fluidized bed spray granulation is carried out by spraying an aqueous salt solution or aqueous salt suspension onto a fluidized bed of particles, is supposed to proceed as follows. Droplets formed by the spraying can form a liquid bridge between two or more particles, thereby forming small agglomerates. Other droplets formed by the spraying may dry to form new small particles. These new small particles may be bridged together to form new small agglomerates or may be incorporated into other agglomerates, thereby growing these agglomerates, and ultimately resulting in larger agglomerates. Meanwhile, the solvent in the liquid bridges will evaporate thereby solidifying the smaller and larger agglomerates. The larger agglomerates may reach a certain size at which the particles become more difficult to fluidize. Such larger particles might be allowed to settle or be removed from the fluidized bed. The remaining smaller agglomerates in the fluidized bed will grow to larger agglomerates, while in the meantime new small agglomerates will have formed and thus allow the process to be continued. The larger agglomerates thus formed typically have a kind of blackberry structure. When growing even larger, the agglomerates may become more rounded off, but can still show remaining images of the smaller particles bound together in the larger agglomerates. Additionally a different way of growing larger particles may occur, namely by deposition of multiple droplets of the solution or slurry on the surface of a particle, which deposited droplets spread and dry, thereby leading to a kind of onion like structure, at least so at the surface layers. Thus, the granulate salt material obtained by the process according to the invention suitably comprises particles having an agglomerated shape or an onion like shape.

The direct solid state polymerization of the granulate salt material produced by fluidized bed spray granulation may be carried out in a reactor, wherein during the polymerization the granulate salt material and the resulting granulate polymer material are mechanically agitated. The reactor can be, for example, a reactor comprising an agitator, or a rotatable reactor, or a combination thereof. The properties of the granulate salt material produced by fluidized bed spray granulation favor the employment of mild mechanical agitation and retention of shape and particle size distribution of the granulate material after polymerization.

The granulate polyamide material directly obtained by direct solid state polymerization of a diammonium dicarboxylate salt prepared by fluidized bed spray granulation typically has good flowability as well as relative high density and low compressibility. This despite the relative small particle size.

Suitably, the granulate polyamide material (A1) used in the process according to the invention consists for at least 90 wt. % of particles with a particle size of at most 3 mm (millimeter). Herein the amount of particles with a particle size of at most 3 mm is determined by sieving and weighing, as determined by the method according to DIN 66-165 part 1 and 2.

Suitably, the granulate polyamide material (A1) has a particle size distribution with a median particle size (d50) in the range of 100-1500 µm (micrometer), more particular in the range of 200-1000 µm, still more particular in the range of 400-750 µm. Herein the particle size distribution is measured with laser granulometry by the method according to ISO 13320-1 at 20° C.

Also suitably, the granulate polyamide material (A1) has a tapped bulk density in the range of 350-750 kg/m3, measured by the method according to ASTM D6393. Suitably, the compressibility, expressed by the ratio of (TBD-ABD)/TBD*100%, is at most 25%. The compressibility is determined by comparing the aerated bulk density (ABD)

and the tapped bulk density (TBD). Each of the aerated bulk density (ABD) and the tapped bulk density (TPB) are measured by the method according to ASTM D6393.

Preferably, the granulate polyamide material (A1) has the following physical properties:
a. a particle size distribution with a median particle size (d50) in the range of 200-1000 μm, measured by laser granulometry with the method according to ISO 13320-1 at 20° C., and
b. a tapped bulk density in the range of 350-750 kg/m3, measured by the method according to ASTM D6393.

The expression "in the range of X-Y", wherein X and Y represent lower and upper limits, has the meaning that the range is from X up to and including Y. In other words, in said expression the values of both limits are included in the range.

The process according to the invention may be a dry-blending process or a melt-blending process.

According to the first embodiment, the process according to the invention is a dry-blending process, and the resulting blend is obtained as a dry-blend. Herein, the mixing apparatus suitably is a stirred reactor or a rotating vessel, or a combination thereof, The advantage thereof is that, apart from absence of need for special shaping steps like compacting or pelletizing, improved dosing and reduced dusting, compared to processing of powder with similar or smaller particle size, that in the mixing apparatus higher loadings and milder mechanical agitation can be applied while still obtaining a good mixing with the at least one further component.

The invention also relates to a polymer composition in the form of a dry-blend, more particular to a dry-blend, obtainable by the dry-blending process, mentioned above. The advantage thereof is that the dry-blend has improved flow properties, compared to corresponding dry-blends comprising the polyamide in powder form, without applying special shaping steps like compacting or pelletizing. When combining the granulate polyamide material (A1) with other good flowing components, A1 can be used in much larger amounts without impairing flowability, compared to a polyamide in powder form. When combining the granulate polyamide material (A1) with other components with less good flow properties, A1 helps to improve the flowability thereof, this in contrast with polyamide in powder form.

The dry-blend suitably comprises a second polymer component (A2). The second polymer may be any other polymer, or polymers other than component (A1)]. The second polymer component (A2) may be present in any suitable form, for example, either in the form of granules, compressed pellets, or powder, or any combination thereof. Next to component A1, the dry-blend can also comprise one or more components (B) other than the polymer components A1 and A2. The dry-blend may also comprise the polymer components A1 and A2 in combination with one or more other components (B). When polymer component A2 is a powder, than the amount thereof is preferably used in an amount of at most 50 wt. %, relative to the weight of polymer component A1, more preferably in an amount of at most 33 wt. % or even better at most 25 w.t. %, relative to the weight of polymer component A1.

According to the second embodiment, the process according to the invention is a melt-mixing process. The melt-mixing process suitably comprises the following features and steps, wherein:
the mixing apparatus is a melt-mixing apparatus;
the process comprises a melt-mixing step, wherein the polymer granulate material (component A1) is dosed into the melt-mixing apparatus and melted in the melt-mixing apparatus to form a polymer melt;
the one or more further components are dosed before, during or after melting of the granulate polyamide material (A1), into the melt-mixing apparatus and mixed with the polymer melt, thereby forming a melt-blend of molten polymer with the one or more further components mixed or dispersed therein;
and wherein the melt-blend is discharged from the melt-mixing apparatus and cooled, thereby obtaining the blend in the form of a solid composite material.

The melt-mixing process is suitably carried out as batch process, for example in a Brabender type mixer, or as a semi-continuous process, for example in an extruder. In the batch process, the constituents are preferably dosed and mixed prior to the melting of the polymeric material. The advantage thereof is that, apart from absence of special shaping steps like compacting or pelletizing prior to blending, that dosing is improved and dusting reduced compared to processing of powder with similar or smaller particle size, and that higher reactor loadings and milder mechanical agitation can be applied while still obtaining a good mixing.

Preferably, the melt-mixing process is carried out in an extruder. Not only is melt-mixing in an extruder most widely employed. Combined with the granulate polyamide material (A1), dosing is improved and dusting reduced compared to processing of powder with similar or smaller particle size, throughput is higher and reactor capacity is better utilized while still obtaining a good mixing.

The process according to the embodiment of the invention comprising melt-mixing in an extruder is favorably utilized for different purposes.

Firstly, the melt-blend is suitably discharged by extruding the melt-blend through a die with one or more orifices, thereby forming polymeric strands. Optionally the polymeric strands so produced are directly cut after leaving die, for example by means of a die face cutter, or the strands are lead through a cutter and are cut, thereby obtaining the solid compound in the form of granules. Such granules can then be used as molding composition for the production of polymer sheets, polymer film and three-dimensional molded parts.

Secondly, the melt-blend can be discharged by extruding the melt-blend through a die with a die slit, thereby forming a polymer sheet or polymer film.

As a third option, the melt-blend is discharged by extruding the melt-blend into a mold with a three-dimensional cavity, cooling and solidifying the melt-blend in the mold, thereby forming a three-dimensional part and discharging the three-dimensional part from the mold.

The advantage of the second and third option is that the polyamide polymer in the granulate polyamide material (A1) has undergone a very limited temperature history while being in the melt, thereby limiting occurrence of thermal degradation of the polyamide, if any.

A further option comprises melt blending of the granulate polyamide material (A1) with a second polymer (component A2) in the extruder. This option is suitably combined with any of the previous three options.

Suitably, the second polymer is selected from the group consisting of polyamide, polyimide, polyester, polycarbonate, functionalized polyethylene and polyfluoroalkanes, and any combination thereof.

Preferably, the second polymer is a polyamide. The polyamide suitably is miscible with the granulate polyamide material (A1), thus allowing to form a miscible blend and optionally occurrence of transamidation resulting in a copolymer between the second polyamide and the granulate polyamide material (A1) being formed prior to discharging. The advantage thereof is that a copolymer is formed under relative modest processing conditions, compared to a melt polymerization process wherein the same copolymer would be prepared by melt polymerization and the complete copolymer constituents have to be held above the melting temperature for a much longer time.

The granulate polyamide material (A1) used in the process according to the invention is obtained by polymerization of a diammonium dicarboxylate salt, i.e. a nylon salt prepared from a diamine and a dicarboxylic acid. The diamine in the salt, as well as in the polyamide prepared from the salt, can be a single diamine, or a mixture of different diamines. Also the dicarboxylic acid can be a single dicarboxylic acid or a mixture of different dicarboxylic acids.

The polyamide used in the process suitably is a homopolymer, i.e. a polyamide polymer obtained from a salt of a single diamine and a single dicarboxylic acid. The polyamide used in the process can also be a copolymer prepared from a mixed salt comprising multiple components. The mixed salt is suitably made of components comprising at least two diamines and one dicarboxylic acid, or one diamine and at least two dicarboxylic acids, or even at least two diamines and at least two dicarboxylic acids.

Suitable, the polyamide in the granulate polyamide material A1 used in the process according to the invention, as well as the salt used for the preparation thereof comprises a diamine selected from aliphatic diamines or aromatic diamines, or any combination thereof. Examples of suitable aliphatic diamines are ethylene diamine, 1,3-propane-diamine, 1,4-diaminobutane, 1,5-pentanediamine, 2-methyl-1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, isophorone diamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, and 1,20-eicosanediamine. Examples of suitable aromatic diamines are 1,4-diaminobenzene, 1,3-diaminobenzene, 1,4-naphthalenediamine, 1,5-naphthalenediamine 2,6-naphthalenediamine, meta-xylenediamine and para-xylenediamine.

Preferably, the diamine comprises at least an aliphatic C2-C10 diamine, i.e. an aliphatic diamine with from 2 up to and including 10 carbon atoms. The advantage thereof is that the salt resulting from the diamine has a higher solubility in water. More preferably, the diamine comprises one or more than one aliphatic C2-C10 diamine in an amount of at least 50 mole %, relative to the total molar amount of diamine. Still more preferably, the amount of aliphatic C2-C10 diamine is at least 75 mole %, relative to the total molar amount of diamine.

In a particular embodiment, the diamine comprises one or more than one aliphatic C4-C6 diamine in an amount of at least 50 mole %, relative to the total molar amount of diamine. More particular, the amount of aliphatic C4-C6 diamine is at least 75 mole %, relative to the total molar amount of diamine. The aliphatic C4-C6 diamine suitably consists of a diamine selected from 1,4-diaminobutane, 1,5-pentanediamine, 2-methyl-1,5-pentanediamine and 1,6-hexanediamine, or any mixture thereof; preferably selected from 1,4-diaminobutane, 1,5-pentanediamine and 1,6-hexanediamine, or any mixture thereof.

Suitably, the dicarboxylic acid is selected from aromatic dicarboxylic acid or aliphatic dicarboxylic acid, or any combination thereof.

Suitable examples of aromatic dicarboxylic acids are terephthalic acid, isophthalic acid, 2,6-naphthalene dicarboxylic acid, 4,4'-diphenyl dicarboxylic acid.

For the aliphatic dicarboxylic acids suitable examples are oxalic acid, succinic acid, 1,5-pentanedicarboxylic acid, adipic acid, 1,7-heptanedioic acid, 1,8-octanedioic acid, azelaic acid, sebacic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nonadecanedioic acid, and 1,20-eicosanedioic acid.

Preferably, the dicarboxylic acid comprises a C4-C10 aliphatic dicarboxylic acid, i.e. an aliphatic dicarboxylic acid with from to 4 up to and including 10 carbon atoms. The advantage thereof is that the salt resulting from the dicarboxylic acid has a higher solubility in water, allowing the use of a higher salt concentration and less water to be evaporated. More preferably, the dicarboxylic acid comprises adipic acid.

The granulate polyamide material (A1) can comprise any polyamide obtainable by DSSP of a diammonium dicarboxylate salt prepared by fluidized bed spray granulation as described above. The polyamide comprised by the granulate polyamide material A1 is an AABB polyamide, comprising alternating AA and BB repeating units, wherein AA represents the repeating units derived from diamine and BB represents the repeating units derived from dicarboxylic acid. Next to the repeating units derived from diamine and repeating units derived from dicarboxylic acid, the polyamide may comprise some miner amounts of other repeating units, i.e. repeating units derived from other monomers. For example small amounts of monofunctional monomers and/or higher functional monomers may be included in the preparation of the salt and the polymerization thereof. Examples of such monomers are monofunctional amines, monofunctional carboxylic acids, triamines and trifunctional carboxylic acids. Suitably such other monomers are dissolved, next to the diamine and the dicarboxylic acid, in the aqueous medium used for the fluidized bed spray granulation. Preferably, the amount of such other monomers is low, for example below 5 mole %, more preferably below 2 mole %, and the polymer consists essentially of repeat units derived from diamines and dicarboxylic acids, i.e. for 95-100 mole %, preferably for 95-100 mole %. Herein the mole % is relative to the total molar amount of monomeric repeating units in the polyamide.

The granulate polyamide material (A1), as well as the salts for its preparation may be aliphatic, semi-aromatic or aromatic. Suitably, the granulate polyamide material A1 comprises a semi-aromatic polyamide, an aliphatic polyamide or an aromatic polyamide, or any copolyamide or any mixture thereof. The granulate polyamide material (A1) suitably comprises at least one semi-aromatic polyamide, but may also comprise a mixture of two or more semi-aromatic polyamides. Alternatively the granulate polyamide material (A1) suitably comprises at least one aliphatic polyamide, or least one aromatic polyamide, or a mixture of two or more aliphatic polyamides, or two or more aromatic polyamide, or a mixture of, for example a semi-aromatic polyamide and an aliphatic polyamide, or an aromatic polyamide and an aliphatic polyamide. Mixtures can easily be by prepared by dry-blending or melt-blending of different granulate polyamide materials prepared from obtained by fluidized bed spray granulation and polymerized by DSSP.

With an aliphatic polyamide is herein understood a polyamide consisting of aliphatic repeat units derived from monomeric units consisting fully or essentially of aliphatic diamine and aliphatic dicarboxylic acid.

With a semi-aromatic polyamide is herein understood a polyamide consisting of repeat units derived from monomeric units consisting fully or essentially of diamine and dicarboxylic acid, comprising at least an aromatic constituent and at least an aliphatic constituent. Suitably, the diamine and dicarboxylic acid in the semi-aromatic polyamide consist of aromatic diamine and aliphatic dicarboxylic acid, or of aliphatic diamine and aromatic dicarboxylic acid, at least one of the diamine and the dicarboxylic acid is partially aromatic and partially aliphatic. The diamine is herein considered to be partially aromatic and partially aliphatic, when it consists of at least two diamines, comprising at least one aromatic diamine and at least one aliphatic diamine. The dicarboxylic acid is herein considered to be partially aromatic and partially aliphatic, when it consists of at least two dicarboxylic acids, comprising at least one aromatic dicarboxylic acid and at least one aliphatic dicarboxylic acid.

The diamine can also be fully aliphatic and comprising at least two different aliphatic diamines. The dicarboxylic acid can also be fully aromatic and comprising at least two different aromatic dicarboxylic acids.

Examples of polyamides that can be employed in the granulate polyamide material A1 according to the invention include the following semi-aromatic polyamides: PA-XT, PA-XI, PA-XT/XI, PA-XT/X6, XT/Y6 and PA-XT/YT, and any copolymer thereof, wherein T represents terephthalic acid, I represents isophthalic acid, 6 represents adipic acid, and X and Y represent diamines.

In a preferred embodiment, X and Y represent different diamines independently from each other chosen from aliphatic diamines from the group consisting of ethylene diamine, 1,4-diaminobutane, 1,5-diamine, 2-methyl-1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, 1,8-octanediamine, 1,9-nonanediamine, and 1,10-decanediamine, and any copolymer thereof.

Eventually the salt, and the polyamide prepared from the salt, may comprise three or more diamines. Suitably these diamines are selected in part, or even all, from the above group.

In a more preferred embodiment, the polyamides are derived from salts based on dicarboxylic acid consisting for at least 75 mole % of terephthalic acid, and diamine consisting for at least 75 mole % of 1,6-hexamethylenediamine (HMDA) and/or 1,4-diaminobutane (DAB) and/or 1,5-pentanediamine. Preferably the diamine comprises 1,6-hexamethylenediamine (HMDA) and 1,4-diaminobutane (DAB) in a molar ratio DAB/HMDA in the range of 25:75-45:55, or even better 30:70-40:60. Also preferable, the diamine comprises 1,6-hexamethylenediamine (HMDA) and 1,5-pentanediamine (PD) in a molar ratio PD/HMDA in the range of 30:70-70:30, or even better 40:60-60:40.

Even more preferred the dicarboxylic acid consists for 95-100 mole % of terephthalic acid, and the diamine consists for at least 95-100 mole % of 1,6-hexamethylenediamine (HMDA), 1,4-diaminobutane (DAB) or 1,5-pentanediamine. Suitably, the corresponding polyamides are either homopolymers PA-4T, PA 5T or PA6T, or copolymers thereof such as PA-4T/5T, PA-4T/6T and PA5T/6T, and PA4T/5T/6T.

Other examples of polyamides that can be used in the process according to the invention include the following aliphatic polyamides: PA-46, PA-66, PA-46/66, PA-66/68, and PA-410, and any copolymer thereof.

The polyamide may also be fully aromatic, i.e. consisting of an aromatic dicarboxylic acid and an aromatic diamine. Example of suitable aromatic polyamides are PA-MXDT and PA-PXDT. MXDT and PXDT salt can be dissolved or prepared from its constituent diamines meta-xylenediamine (MXD) respectively para-xylenediamine (PXD) and terephthalic acid (T) as carboxylic acid, in water or in an aqueous liquid, can be isolated from an aqueous solution by fluidized bed spray granulation, and can also be polymerized by direct solid state polymerization. The polyamide may also be a copolyamide such as, for example, a copolyamide of one or more of the semi-aromatic polyamides and one or more of the aliphatic polyamides; one or more of the aromatic polyamides and one or more of the aliphatic polyamides; or one or more of the semi-aromatic polyamides and one or more of the aromatic polyamides; and combinations thereof.

Preferably the copolyamide is a copolyamide of one or more of the mentioned semi-aromatic polyamides and one or more of the said aliphatic polyamides. Examples thereof are PA-XT/YT/X6/Y6, wherein T represents terephthalic acid, 6 represents adipic acid, and X and Y represent different diamines. In these copolymers the diamine may also suitably comprise three or more diamines.

In the process according to the invention, the granulate polyamide material A1 is mixed with at least one further component. Suitably, the at least one further component comprises a second polymer component (A2); and/or at least one or more other components.

The second polymer component (A2); can be any polymer other than component (A1)], and can also be a combination of different polymers. The second polymer component (A2) may comprise, for example, one or more polymers selected from polyamide, polyimide, polyester, polycarbonate, functionalized polyethylene and polyfluoroalkanes, and preferably comprises a polyamide.

The at least one other component (B) suitably comprises or may even consist of one or more components selected from the groups consisting of reinforcing agents and fillers; flame retardants and flame retardant synergists; stabilizers (for example, heat stabilizers and light stabilizers), pigments, colorants, processing aids (for example, lubricants and release agents) and further auxiliary additives used in polyamide moulding compositions; and any combination thereof.

In the process according to the invention component (B) may also comprise a liquid components, or a reactant. A reactant is herein understood to be a compound having a functional group capable of reacting with the polyamide. The reactant can be, for example, a chain stopper or a chain extender. As a chain stopper, suitably a monofunctional amine or a monofunctional dicarboxylic acid is used. As a chain extender, suitably a difunctional amine or a difunctional dicarboxylic acid is used.

A liquid component may be used, for example, as a binder in a dry blending process, to coat the granulate polyamide material A1 with small amounts of additives. Herein the amount of the liquid component shall be sufficiently low to retain the dry powder state of the dry-blend.

Suitably, the composition prepared by the process according to the invention, and any of its embodiments thereof, comprises:

(A1) 10-90 wt. % of granulate polyamide material A1;
(A2) 0-30 wt. % of a second polymer component (A2);
(B1) 0-60 wt. % of one or more reinforcing agents and/or fillers;
(B2) 0-30 wt. % of one or more flame retardants and/or flame retardant synergists; and
(B3) 0-20 wt. % of one or more further additives;
wherein the weight percentages (wt. %) are relative to the total weight of the composition and the sum of (A1), (A2), (B1), B2) and (B3) amounts to 100 wt. %.

In a particular embodiment, the composition prepared by the process according to the invention, and any of its embodiments thereof, comprises:
(A1) 30-90 wt. % of granulate polyamide material A1;
(A2) 0-25 wt. % of a second polymer component (A2);
(B1) 0-60 wt. % of one or more reinforcing agents and/or fillers;
(B2) 0-20 wt. % of one or more flame retardants and/or flame retardant synergists; and
(B3) 0-20 wt. % of one or more further additives;
wherein the weight percentages (wt. %) are relative to the total weight of the composition and the sum of (A1), (A2), (B1), B2) and (B3) amounts to 100 wt. %.

The invention is further illustrated with the following examples and comparative experiments.

Materials

For the raw materials, terephthalic acid, 1,4-butanediamine, and hexamethylenediamine, industrial grades were used.

Methods

Aerated Bulk Density (ABD) and Tapped Bulk Density (TBD)

The ABD and TBD were measured by the method according to ASTM D6393-08 ("Standard Test Method for Bulk Solids Characterization by Carr Indices", ASTM International, West Conshocken, Pa., DOI: 10.1520/D6393-08) with a Hosokawa Powder Tester at 20° C.

Particle Size Distribution by Laser Diffraction

The particle size distribution of granulate material, and d10, d50 and d90 values, were measured by laser granulometry according to ISO 13320-1 with a Sympatec Helos (H0024) & Rodos apparatus at 20° C. with an applied pressure of 0.5 bar and an measured under-pressure in the venturi of 25 mbar. From the results the Span, defined by the ratio of (d90-d10)/d50, is calculated.

Flow Behavior in Shear Test

The flowability was measured by the method according to ASTM Standard D6773-08 ("Standard Shear Test Method for Bulk Solids Using the Schulze Ring Shear Tester", ASTM International, West Conshocken, Pa., DOI: 10.1520/D6773-08). The shear test was performed with a Schulze Ringshear Tester at 20° C. with a consolidation stress of 3 kPa. The measurement was started immediately after filling of the tester. The flow behavior was performed on freshly prepared material, stored in a dry environment.

Experiments

Preparation of Salt Solution

For the preparation of salts by fluidized bed spray granulation experiments, salts solutions were used, which were prepared as follows. A solution of terephthalic acid, 1,4-butanediamine and/or hexamethylenediamine in water were prepared by adding a 1,4-butanediamine solution in water, a hexamethylenediamine solution in water and terephthalic acid to a complementary amount of water under stirring and heating. The liquid mixture was heated to 60° C., upon which a clear solution was obtained. Upon cooling during storage, the dissolved salt partially crystallized out, resulting in a slurry. Upon reheating the partially crystallized salt dissolved again.

Solutions were prepared with concentrations between 28 and 50 wt. % salt. The concentration is calculated as the wt. % of all salt components, relative to the total weight of the solution. The applied ratio between 1,4-butanediamine and hexamethylenediamine was in the range of 36/64 and 42/58. The molar ratio between terephthalic acid and diamine was preset at 0.995, aiming at a slight excess of diamine.

Fluidized Bed Spray Granulation

SG-1 and SG-2

Fluidized bed spray granulation was performed on pilot scale in a Glatt AGT 400 apparatus, comprising a spray column provided with spray nozzles at the top and center of the spray column and a classification channel at the center in the bottom. A salt solution was either freshly prepared or taken from storage and heated to 50° C.-60° C. The heating was performed by providing an electrical heating jacket around a storage bin. A fluidized bed of salt powder was prepared using a small amount of salt powder prepared on lab scale in a Glatt GPCC 3.1 apparatus. In the lab scale experiment, an initial bed was prepared from salt particles obtained by spray drying. The gas inlet temperature in the experiment on pilot scale was varied between 100° C. and 150° C. The flow of fluidization/heating gas was varied, thereby varying the residence time of the particles and allowing the particles to grow to larger particle size (SG-1) or smaller particle sized (SG-2). The bed temperature was controlled to be between 40° C. and 55° C.

Dry Salt Preparation Dry-Salt-1

Dry salt preparation was carried out in a reactor equipped with a mechanical stirrer. Solid terephthalic acid (245 kg) was charged into the reactor, stirred and heated to 60° C. A mixture of 48 kg 1,4-butanediamine and 110 kg hexamethylenediamine was prepared in a dosing vessel and heated to 60° C. The diamine mixture was dosed to the terephthalic acid under stirring, while maintaining the temperature in the reactor between 30° C. and 95° C. After completion of the dosing the reactor content was kept at 95° C. while remaining stirring. The total batch cycle time of the salt formation step was 32 hours. Then the reactor content was cooled and discharged.

Direct Solid State Polymerization

Direct solid state polymerization (DSSP) at larger scale was carried out in a 1 m3 reactor equipped with a mechanical stirrer. Prior to the experiment the reactor was cleaned and inertized with nitrogen gas. Then the reactor was charged with 325 kg of salt powder SG-1, respectively SG-2 and Dry-Salt-1 mentioned above. The salt was stirred at a rotation speed of the stirrer of 16.4 rpm and heated while kept under stirred motion, applying a temperature profile, wherein the salt was heated with a heating rate of 0.5° C./min to 180° C., kept at that temperature for 4 hours, then further heated with a heating rate of 10° C./min to 265° C. and kept at that temperature for 14 hours. During the polymerization some diamine might have been lost, resulting in some excess of dicarboxylic acid. Additional diamine was dosed to the reactor content at the end of the reported temperature profile and maintained at that temperature until a VN of 70-74 was obtained. The reactor content was cooled and discharged from the reactor. The discharged material was collected and analyzed.

Properties and analytical results of the granulate polymer material obtained by DSSP for SG-1 and -2 and the Dry-salt-1 are shown in Table 1.

TABLE 1

Analytical results of polyamide products obtained by DSSP

| Salt | CE-A Dry-Salt 1 | EX-I SG-1 | EX-II SG-2 |
|---|---|---|---|
| D10 (μm) | 38 | 314 | 136 |
| D50 (μm) | 97 | 490 | 298 |
| D90 (μm) | 227 | 693 | 464 |
| Span | | 0.77 | 1.10 |
| Bulk density (kg/m$^3$) Aerated | | 589 | 476 |
| Bulk density (kg/m$^3$) Tapped | | 663 | 606 |
| Compressibility (%) | | 11 | 21 |

Compounding Experiments.

Comparative Experiment A

Compounding experiments were carried out on a Krauss-Maffei 20 Berstorff ZE25 (length=48 L/D) extruder. Dry-salt-1 was gravimetically fed into the extruder at the feed-throat at a feed-rate of 2.5 kg/hr. The extruder ran at 350 rpm. The polymer was melted up in a melting section. Further components were dosed onto the melt via a side-feeder. The resulting material was vacuum degassed before being extruded as strands through a die with multiple orifices and strand granulated. Any throughput on the feed-throat larger than 2.5 kg/hr led to flooding.

EXAMPLE I

Comparative A was repeated except that Dry-salt 1 was replaced by SG-1, and the extruder ran at 325 rpm. The feed rate of polymer at the feed-throat was increased up to 15 kg/hr, which still did not lead to flooding. Setting the throughput larger than 15 kg/hr led to flooding of the feed-throat.

EXAMPLE I

Comparative A was repeated except that Dry-salt 1 was replaced by SG-2, and the extruder ran at 325 rpm. The feed rate of polymer at the feed-throat could be increased up to about 12 kg/hr, which still did not lead to flooding. Setting the throughput larger than 12 kg/hr led to flooding of the feed-throat.

Results

Direct compounding of the material used in comparative experiment A at normal throughputs (25 kg/hr total including additives and other polymers or components), was not possible. In order to produce compounds of this material, it had to be pre-granulated at low throughputs. The produced pellets could then be used in making the compound. The materials SG-1 and SG-2 used in Examples 1 and 2 could directly be used in compounding without pre-granulation.

The invention claimed is:

1. A process for preparing a polymer composition comprising the steps of:
   (a) preparing a diammonium dicarboxylate salt solution by dissolving a diamine and a dicarboxylic acid in water or in an aqueous solvent;
   (b) preparing a diammonium dicarboxylate salt granulate material by fluidized bed spray granulation of the diammonium dicarboxylate salt solution obtained in step (a);
   (c) preparing a first polymer A1 by direct solid state polymerization of the diammonium dicarboxylate salt granulate material obtained from step (b), thereby obtaining the first polymer A1 as a granulate polyamide material, and thereafter
   (d) preparing the polymer composition by dosing the first polymer A1 directly obtained from step (c) and at least one further component in a mixing apparatus and blending the granulate polyamide material of the first polymer A1 directly obtained from step (c) and the at least one further component in the mixing apparatus.

2. The process according to claim 1, wherein the mixing apparatus is a melt-mixing apparatus;
   the process comprises a melt-mixing step, wherein the polymer granulate material is dosed into the melt-mixing apparatus and melted in the melt-mixing apparatus to form a polymer melt;
   the one or more further components are dosed before, during or after melting of the granulate polyamide material, into the melt mixing apparatus and mixed with the polymer melt, thereby forming a melt-blend of molten polymer with the one or more further components mixed or dispersed therein; and wherein
   the melt-blend is discharged from the melt-mixing apparatus and cooled, thereby obtaining the blend in the form of a solid composite material.

3. The process according to claim 2, wherein the melt-mixing apparatus is an extruder.

4. The process according to claim 2, wherein the melt-blend is discharged by extruding the melt-blend through a die with one or more orifices, thereby forming polymeric strands.

5. The process according to claim 2, wherein the melt-blend is discharged by extruding the melt-blend through a die with a die slit, thereby forming a polymer sheet or polymer film.

6. The process according to claim 2, wherein the melt-blend is discharged by extruding the melt-blend into a mold with a three-dimensional cavity, cooling and solidifying the melt-blend in the mold, thereby forming a three-dimensional part and discharging the three-dimensional part from the mold.

7. The process according to claim 2, wherein the granulate polyamide material is mixed and melt-blended with a second polyamide polymer, miscible with the granulate polyamide material, resulting in a copolymer between the second polyamide and the granulate polyamide material being formed in the extruder.

8. The process according to claim 1, wherein the granulate polyamide material has a particle size distribution with a median particle size in the range of 200-1000 μm, measured by laser granulometry with the method according to ISO 13320-1 at 20° C.

9. The process according to claim 1, wherein the granulate polyamide material comprises a semi-aromatic polyamide, an aliphatic polyamide, an aromatic polyamide, or any copolyamide or any mixture thereof.

10. The process according to claim 1, wherein the at least one further component comprises a second polymer component and/or at least one additive selected from the group consisting of reinforcing agents, reinforcing fillers, flame retardants, flame retardant synergists, stabilizers, pigments, colorants, processing aids, and auxiliary additives used in polyamide moulding compositions.

* * * * *